United States Patent
Bantle et al.

(10) Patent No.: US 8,336,684 B2
(45) Date of Patent: Dec. 25, 2012

(54) STOP DAMPER

(75) Inventors: Ulrich Bantle, Empfingen (DE); Jürgen Eschle, Aichhalden (DE)

(73) Assignee: Karl Simon GmbH & Co. KG, Aichhalden (DE)

( * ) Notice: Subject to any disclaimer, the term of this patent is extended or adjusted under 35 U.S.C. 154(b) by 473 days.

(21) Appl. No.: 12/312,092

(22) PCT Filed: Aug. 16, 2007

(86) PCT No.: PCT/EP2007/007208
§ 371 (c)(1),
(2), (4) Date: Feb. 8, 2010

(87) PCT Pub. No.: WO2008/049477
PCT Pub. Date: May 2, 2008

(65) Prior Publication Data
US 2010/0133731 A1    Jun. 3, 2010

(30) Foreign Application Priority Data
Oct. 26, 2006 (DE) .......................... 10 2006 050 993

(51) Int. Cl.
*F16F 9/48* (2006.01)
(52) U.S. Cl. .................. 188/284; 188/322.15; 16/66
(58) Field of Classification Search ............... 267/64.26, 267/118, 124, 226; 188/284, 282.7, 322.15; 16/66, 84
See application file for complete search history.

(56) References Cited

U.S. PATENT DOCUMENTS

| 4,110,868 | A | | 9/1978 | Imazaike |
| 4,440,273 | A | * | 4/1984 | Butler ........................... 188/315 |
| 4,877,226 | A | * | 10/1989 | Taylor ........................... 267/196 |
| 4,948,103 | A | * | 8/1990 | Bowden et al. .................. 267/34 |
| 7,455,154 | B2 | * | 11/2008 | Bantle et al. ................... 188/287 |
| 2002/0170794 | A1 | * | 11/2002 | Dubach ........................... 188/381 |
| 2007/0271732 | A1 | * | 11/2007 | Bantle et al. ...................... 16/84 |
| 2008/0217126 | A1 | | 9/2008 | Bantle et al. |

FOREIGN PATENT DOCUMENTS

| DE | 102 51 169 A1 | 5/2004 |
| DE | 10 2004 060 398 A1 | 7/2006 |
| EP | 0 841 451 A2 | 5/1998 |
| EP | 1 236 925 A2 | 9/2002 |
| WO | WO 03/100287 A1 | 12/2003 |
| WO | WO 2006/063657 A2 | 6/2006 |

OTHER PUBLICATIONS

Abandoned U.S. Appl. No. 10/581,584, filed Jun. 11, 2007; inventors Ulrich Bantle et al.; title End-Stop Damper.
Co-Pending U.S. Appl. No. 12/084,213, filed Apr. 28, 2008; inventors Ulrich Bantle et al.; title Stop Damper.

* cited by examiner

*Primary Examiner* — Pamela Rodriguez
(74) *Attorney, Agent, or Firm* — Pauley Petersen & Erickson

(57) ABSTRACT

A stop damper with a damper member including a receiving space inside which a piston is movably guided between an initial and an inserting position. The piston includes a bellows section and a sealing element, the sealing element resting on a sliding surface of the damper member and the bellows section being allocated to a rest section of the damper member at the initial position. To improve a damping characteristic of a stop damper, the rest section includes at least sectionwise a region that enlarges in the direction of the inserting movement of the piston.

17 Claims, 4 Drawing Sheets

STOP DAMPER

BACKGROUND OF THE INVENTION

1. Field of the Invention

This invention relates to a stop damper with a damper element that has a receiving space inside which a piston is movably guided between an initial position and an inserted position. The piston has a bellows section and a sealing element. The sealing element rests against a sliding surface of the damper element. In the initial position, the bellows section is associated with a contacting section of the damper element.

2. Discussion of Related Art

A stop damper of this type is taught by German Patent Reference DE 10 2004 060 398 A1. In this case, the damper element has a receiving space delimited by a cylindrical wall that constitutes the sliding surface. A piston with a bellows section formed onto it is inserted into the receiving space. The bellows section has a circumferential sealing element that rests against the sliding surface. The piston has a piston rod integrally formed onto it, which extends out from the damper element.

When the piston rod slides into the damper element, this moves the piston and produces a positive pressure in the chamber enclosed by the bellows section, causing the bellows section to inflate and then comes to rest against the sliding surface. The friction forces exerted there brake the insertion movement of the piston. The force on the piston rod is exerted, for example, by a door, a hatch, a drawer, or a mounting component, such as of a hinge. With an impulse-like impact of the door, etc., the stop damper absorbs the impulse, abruptly producing a powerful braking force of the bellows section. As a result, part of the impulse is conveyed back to the door. The door then rebounds a certain distance, which is undesirable.

SUMMARY OF THE INVENTION

One object of this invention is to provide a stop damper of the type mentioned above but that has a user-friendly damping characteristic.

This object is attained if in at least some areas, the contacting section has a region that expands in the direction of the insertion movement of the piston.

Because of the expanding embodiment of the contacting section, the distance between the bellows section and the sliding surface varies in the direction of movement. The spacing of the bellows is small, for example, in the region associated with the initial position. Consequently, a braking action between the bellows section and the contacting section can be produced quickly because it is only necessary to thus inflate the bellows section slightly. The piston then simultaneously moves toward the inserted position. Consequently, the cross section of the contacting section that is in contact with the bellows section also widens with the movement of the piston.

The bellows section must then be supplied with additional expansion work. This effect assures that braking force is produced quickly, starting from the initial position. However, this braking force is not generated abruptly, which at the very least, sharply reduces the rebound effect on the striking door.

According to one embodiment of this invention, the contacting section is conical, in particular in the form of a conical bore, which is associated with a circumferential wall section of the bellows section.

The bellows section can come to rest circumferentially against the conical bore with a powerful braking force. In this case, the stop damper can be embodied so that the circumferential wall section of the bellows section has a cylindrical contour. Thus, the spaced-apart region is enlarged continuously as the insertion movement continues.

If the construction is selected so that in the initial position, the bellows section is associated with the conically expanding region of the contacting section, then this has a particularly positive influence on the rebound behavior of the stop damper.

A reliable seal of the pressure chamber over the entire movement path of the piston can be achieved if between the initial position and the inserted position, the sealing element is guided along a cylindrical region of the sliding surface.

If after traveling past or beyond the contacting section during the insertion movement, the bellows section travels past or beyond a cylindrical bore region or a bore region with an altered conicity angle, then this can change the damping curve. It is thus also possible to produce degressive or progressive damping curves.

According to one embodiment of this invention, the surface roughness of the sealing element and/or of the sliding surface and/or of the contacting section is produced by a periodic structure, for example a fluted structure. This achieves a favorable guidance during the movement of the piston.

The surface structuring also inhibits an excessively powerful adhesive sticking of the bellows section, which would result in a powerful wear on the bellows. In this case, it is possible for the flutes of the fluted structure to be situated with their longitudinal span oriented transverse with respect to the movement direction of the piston. The flutes of the fluted structure in this case can be let into the sliding surface or contacting section circumferentially and transverse with respect to the movement direction of the piston. The flutes are at an angle $\geq 0$ and $<90°$ in relation to the movement direction of the piston.

Preferably, it is possible for the pitch angle of the flutes to be selected so that the annular, circumferential sealing element overlaps only one flute or a small number of flutes (<20 flutes) over its entire circumference. There is thus always a flute cross section available, which depending on the elasticity of the sealing element, forms a definite air passage gap that on the one hand, assures a smooth sliding of the sealing element and on the other hand, prevents air from escaping too quickly from the pressure chamber during the compression stroke of the piston.

BRIEF DESCRIPTION OF THE DRAWINGS

This invention is explained in view of an exemplary embodiment shown in the drawings, wherein.

DETAILED DESCRIPTION OF THE INVENTION

Figure 1:
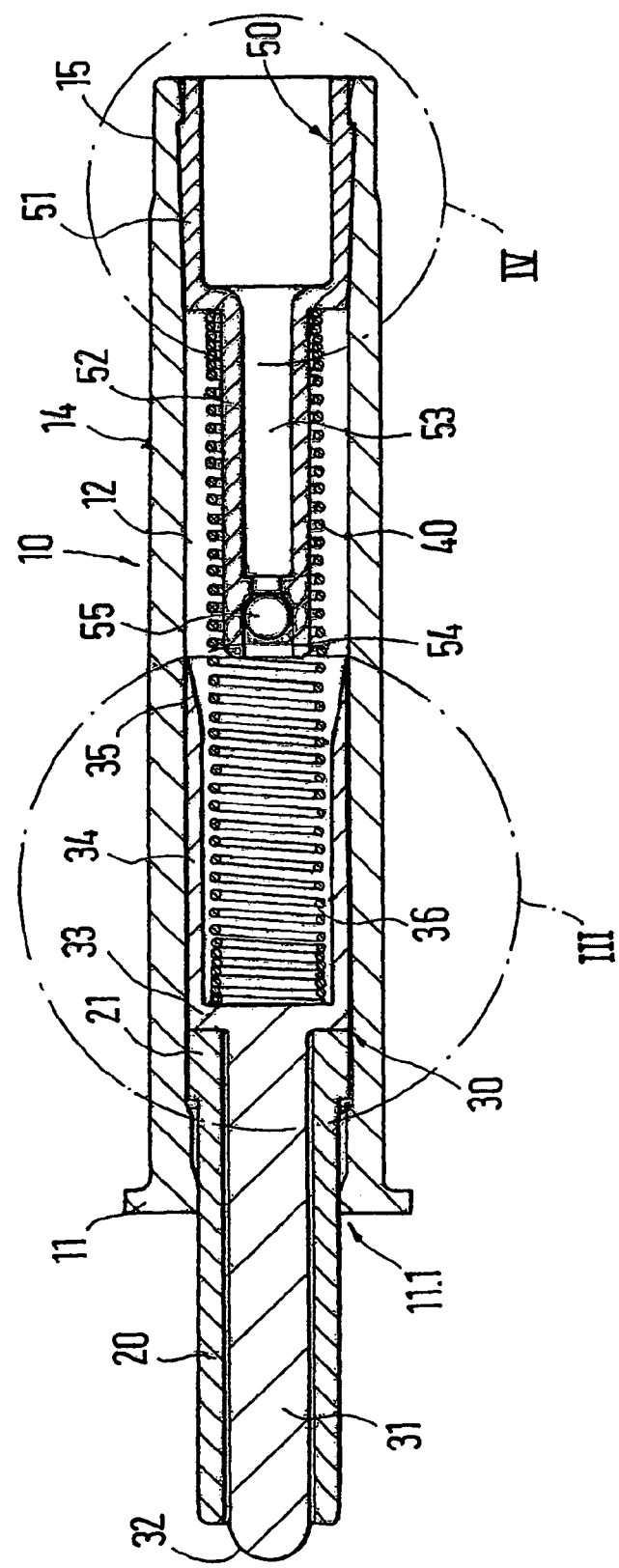
FIG. 1 shows a full side cross sectional view of a stop damper.
Figure 2:
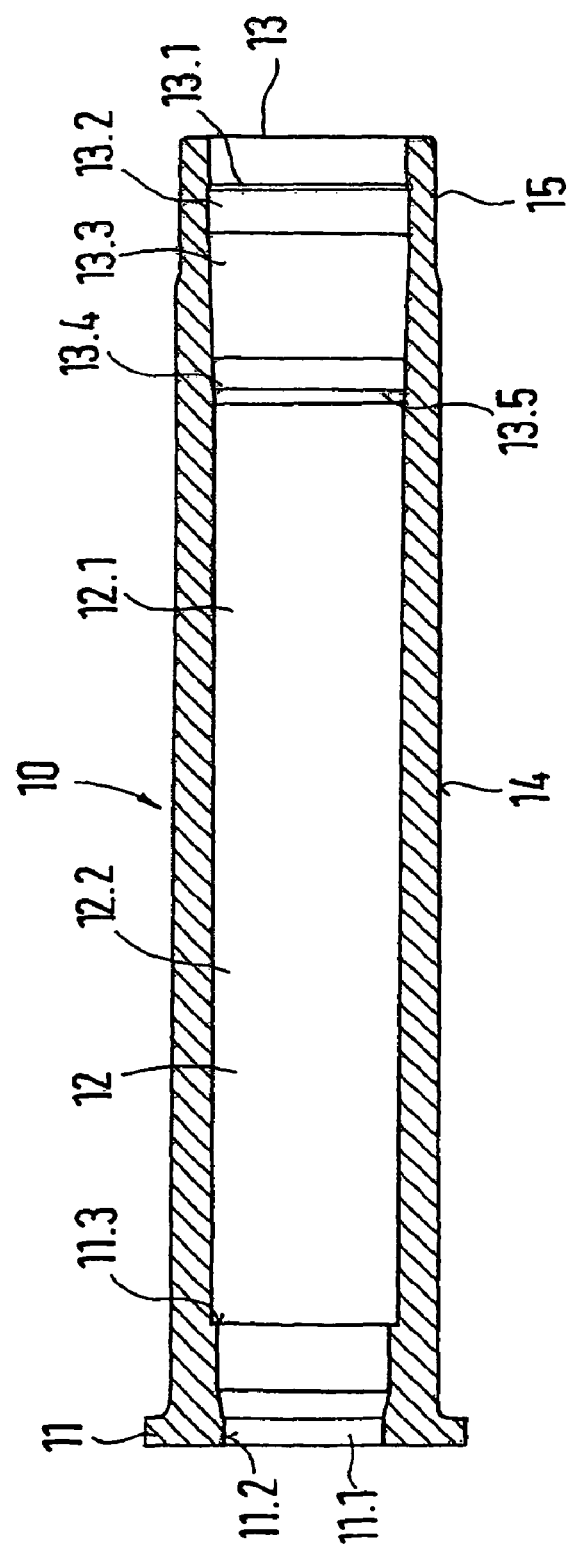
FIG. 2 shows a full side cross sectional view of a damper element of the stop damper according to FIG. 1.

FIG. 1 shows a stop damper with a damper element 10. The damper element 10 is depicted in the detail view in FIG. 2. As shown in the latter depiction, the damper element 10 has an essentially cylindrical, elongated, tubular geometry and encloses a receiving space 12 that is accessible at the rear end of the damper via an installation opening 13 and is accessible at the front end via a through opening 11.1.

The installation opening 13 is adjoined by a conical cross-sectional narrowing that constitutes or forms an insertion bevel. The insertion bevel transitions into a steep, radially oriented detent flank 13.1. The detent flank 13.1 is adjoined by an diametrically enlarged cylindrical sealing section 13.2. The sealing section 13.2 transitions into a conically embodied recess 13.3, which in turn transitions into another cylindrical sealing section 13.4.

The recess 13.3 has a slight conicity with a small cone angle and narrows in the direction toward the through opening 11.1. After the second sealing section 13.4, a diametrically reduced stop region 13.5 is provided. After the stop region 13.5, the receiving space 12 has a sliding surface 12.1, which transitions into a contacting section 12.2 in the direction toward the through opening 11.1.

The through opening 11 is delimited by a sliding guide 11.2. A stop 11.3 in the form of a diametrical reduction is formed between the through opening 11.1 and the contacting section 12.2.

The sliding surface 12.1 has a cylindrical geometry. The contacting section 12.2, however, has a small cone angle. The contacting section 12.2 has its largest diameter in the region adjacent to the sliding surface 12.1 and narrows in the direction toward the through opening 11.1.

As shown in FIG. 1, a combination, comprising a piston 33 with a piston rod 31 formed onto it and a support element 20, is inserted into the receiving space 12. The piston 33 supports a formed-on, tubular bellows section 34 that transitions into a sealing element 35 at the end. The sealing element 35 is in the form of a thin, circumferential sealing lip. The bellows section 34 encloses a spring receptacle 36. At the end oriented away from the bellows section 34, the piston rod 31 is integrally formed onto the piston 33 and terminates at an end cap 32.

The piston 33, including the piston rod 31, comprises a flexible material. In order to prevent the piston rod 31 from buckling, it is encompassed by a tubular support element 20 of a harder material.

In the connecting region to the piston 33, the support element 20 rests with a stop element 21 against the piston 33. The stop element 21 is embodied as a diametrically enlarged collar section.

Figure 3:
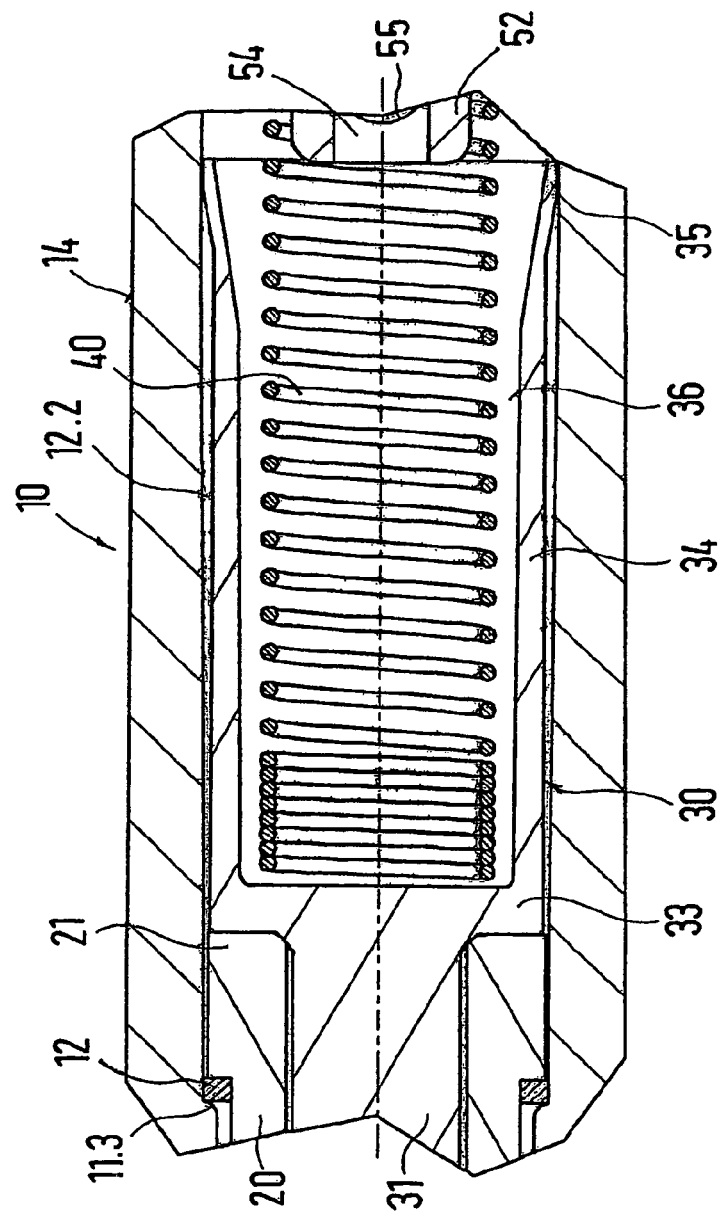
FIG. 3 shows an enlarged depiction of a detail identified by circle III in FIG. 1.

In the initial position shown in FIG. 1, the bellows section 34 is positioned in the region of or near the contacting section 12.2 of the damper element 10, as shown in FIG. 3. The cylindrical outer contour of the bellows section 34 is circumferentially spaced a short distance apart from the contacting section 12.2. The sealing element 35 is situated in the region of or near the sliding surface 12.1 and rests against it.

With its stop element 21 against the stop 11.3, the support element 20 prevents the piston 33 from being pulled out through the through opening 11.1.

Figure 4:
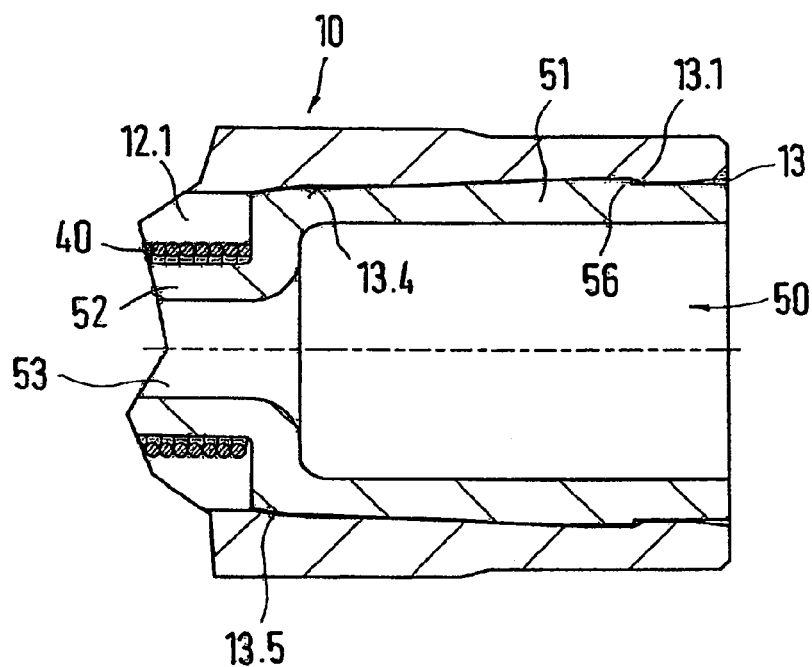
FIG. 4 shows an enlarged depiction of a detail identified by circle IV in FIG. 1.

As shown in FIG. 1, the end of the damper element 20 oriented toward the installation opening 13 is filled by a stopper element 50. The embodiment of the stopper element 50 is shown in greater detail in FIG. 4, which will be discussed below.

The stopper element 50 has a sealing element 51, which has molded cylindrical outer contour regions that are adapted to the sealing sections 13.2, 13.4. In this case, these regions have an interference fit so that an air-tight snug fit is produced. The cup-shaped sealing element 51 is adjoined by a detent recess 56. Adjacent to this, the stopper element 50 terminates at a diametrically reduced end section. The insertion movement of the stopper element 50 is limited in the stop region 13.5.

Oriented away from detent recess 56, the stopper element 50 has a spring mount 52 in the form of a cylindrical element formed onto it, in which a conduit 53 is provided.

As shown in FIG. 1, a bore 54 is let into the end of the spring mount 52 oriented away from the sealing element 51. The bore 54 transitions into the conduit 53 via a cross-sectional narrowing. Between the cross-sectional narrowing and the bore 54, a seat is formed, against which an insert piece 55 rests, in this case a metal ball, that is press-fitted into the bore 54.

The ball closes off the air passage between the bore 54 and the environment. In order to nevertheless obtain an air-conveying connection between the receiving space 12 and the environment, at least one flute extending in the longitudinal direction of the damper element 10 is let into the wall of the bore. The flute cross-section is not overlapped by the insert piece 55 so that the air-conveying connection is reproducibly achieved with a precisely predetermined airflow cross section.

The spring mount 52 accommodates a spring element 40 embodied as a helical spring. One end of the spring rests against the sealing element 51. At the end oriented away from the sealing element 51, the spring element 40 is placed into the spring receptacle 36 encompassed by the bellows section 34 and its end there rests against the piston 33 so that the piston 33 is prestressed in opposition to the insertion direction of the piston 33.

In order to assemble the stop damper, first, the support element 20 is threaded onto the piston rod 31. Then this assembly is slid through the installation opening 13 into the receiving space 12.

During this, the support element 20 is slid through the through opening 11.1. The cylindrical outer contour of the support element 20 is guided precisely on the sliding guide 11.2. Then, the spring element 40 is placed into the spring receptacle 36 of the bellows section 34. Then, the stopper element 50 with its spring mount 52 can be inserted into the spring element 40. The spring element 40 is placed under stress when the stopper element 50 is slid through the installation opening 13. The stopper element 50 is then pressed into the sealing sections 13.2, 13.4, simultaneously causing the detent flank 13.1 to snap into place behind the detent recess 56.

The stop damper functions as described in the following specification.

Starting from the initial position shown in FIG. 1, a force is exerted on the end cap 32 of the piston rod 31.

This force is exerted, for example, by a striking door, a hatch, a drawer, or a mounting component, such as a hinge. Because of this force, the piston 33 is moved toward the installation opening 13. During this, a pressure is built up in the part of the receiving chamber 12 delimited by the bellows section 34, which pressure is greater than the pressure in the region of the receiving chamber 12 surrounding the bellows section 34. This pressure differential causes the bellows section 34 to inflate. As a result, the outer circumference of the bellows section 34 comes to rest against the inner wall of the contacting section 12.2. Due to the conicity of the contacting section 12.2, the bellows section 34 is spaced only a slight distance apart from the contacting section 12.2 so that a braking action due to the friction between the bellows section 34 and the contacting section 12.2 is achieved quickly. The piston 33 then moves toward the installation opening 13. Consequently, the braking region of the contacting section 12.2 in contact with the bellows section 34 also widens.

The bellows section 34 thus is supplied with additional expansion work produced by the pressure difference. This effect assures that starting from the initial position, a braking force is in fact built up quickly, but is not generated abruptly, but it is then maintained. This prevents the piston 33 from absorbing the impact of the door, and other elements, in a quasi-static fashion and from transmitting part of it back to the door, and other elements, in the form of an impulse. The striking door, and other elements, consequently does not rebound or does so only slightly.

The sealing element 35 assures a uniformly good sealing action by sliding along the cylindrical region of the sliding surface 12.1.

After the bellows section 34 has dissipated a significant portion of the energy, it continues to be guided against the cylindrical sliding surface 12.1 in order to smooth out the course of the movement.

During the compression stroke, pressure is continuously decreased via the bypass around the insert piece 55. This pressure decrease occurs very slowly due to the small bypass cross section, thus assuring continuous damping.

Once the stress on the piston rod 31 is relieved, the spring element 40 pushes the piston 33 continuously out of the inserted position, into the initial position shown in FIG. 1. During this, a pressure compensation occurs via the bypass. During the resetting action, the bellows section 34 no longer rests against the damper element 10.

Both the sliding surface 12.1 and the contacting surface 12.2 are produced by a fluted structure. The longitudinal span of the flutes extends transverse to the movement direction of the piston 33. The fluted structure is predetermined in the tool mold or the injection-molding die.

Preferably, a fluted structure is produced over a rotated surface so that the flutes extending around the inner wall of the cylinder are at an angle in relation to the movement direction of the piston 33. The angle or infeed here is small enough, <5° in the present case, so that the lip-shaped sealing element 35 always travels over only a small number of flutes, such as <20 flutes, in the sealing region. This achieves an optimal sliding and wear behavior of the sealing element 35.

The fluted structure shown in FIG. 12 assures a sufficient sealing action so that the sealing element assures the pressure buildup.

The fluted structure, the negative contour of the mold, can be polished so that the fluted structure is of partition walls. This fluted structure has a high load-carrying portion, which has an optimal influence on the sliding properties.

The invention claimed is:

1. A stop damper with a damper element (10), comprising a receiving space (12) inside which a piston (33) is movably guided between an initial position and an inserted position; the piston having a bellows section (34) and a sealing element (35); the sealing element (35) resting against a sliding surface (12.1) of the damper element (10); in the initial position the bellows section (34) associated with a contacting section (12.2) of the damper element (10); and in at least some areas the contacting section (12.2) having a region that expands in a direction of an insertion movement of the piston (33).

2. The stop damper as recited in claim 1, wherein an expanding region of the contacting section (12.2) is a conical bore which is associated with a circumferential wall section of the bellows section (34).

3. The stop damper as recited in claim 2, wherein the circumferential wall section of the bellows section (34) has a cylindrical contour.

4. The stop damper as recited in claim 3, wherein in the initial position the bellows section (34) is associated with the conically expanding region of the contacting section (12.2).

5. The stop damper as recited in claim 4, wherein between the initial position and the inserted position, the sealing element (35) is guided along a cylindrical region of the sliding surface (12.1).

6. The stop damper as recited in claim 5, wherein after traveling beyond the contacting section (12.2) during the insertion movement, the bellows section (34) travels beyond a cylindrical bore region or a bore region with an altered conicity angle.

7. The stop damper as recited in claim 6, wherein a surface roughness of the sealing element (35) and/or of the sliding surface (12.1) and/or of the contacting section (12.2) is produced by a periodic structure or a fluted structure.

8. The stop damper as recited in claim 7, wherein the flutes of the fluted structure are let into a sliding surface (18) of the sealing element (35) and/or the contacting section (12.2) circumferentially and transverse with respect to the movement direction of the piston (33) and the flutes extend at an angle in relation to a movement direction of the piston (33).

9. The stop damper as recited in claim 8, wherein the pitch angle of the flutes is selected so that the annular, circumferential sealing element (35) overlaps only a small number of flutes over an entire circumference.

10. The stop damper as recited in claim 7, wherein flutes of the fluted structure are situated with a longitudinal span oriented transverse with respect to a movement direction of the piston (33).

11. The stop damper as recited in claim 10, wherein the flutes of the fluted structure are let into the sliding surface (18) of the sealing element (35) and/or the contacting section (12.2) circumferentially and transverse with respect to the movement direction of the piston (33) and the flutes extend at an angle in relation to the movement direction of the piston (33).

12. The stop damper as recited in claim 11, wherein the pitch angle of the flutes is selected so that the annular, circumferential sealing element (35) overlaps only a small number of flutes over an entire circumference.

13. The stop damper as recited in claim 1, wherein in the initial position the bellows section (34) is associated with the conically expanding region of the contacting section (12.2).

14. The stop damper as recited in claim 1, wherein between the initial position and the inserted position, the sealing element (35) is guided along a cylindrical region of the sliding surface (12.1).

15. The stop damper as recited in claim 1, wherein after traveling beyond the contacting section (12.2) during the insertion movement, the bellows section (34) travels beyond a cylindrical bore region or a bore region with an altered conicity angle.

16. The stop damper as recited in claim 1, wherein a surface roughness of the sealing element (35) and/or of the sliding surface (12.1) and/or of the contacting section (12.2) is produced by a periodic structure or a fluted structure.

17. The stop damper as recited in claim 1, wherein flutes of the fluted structure are situated with a longitudinal span oriented transverse with respect to a movement direction of the piston (33).

* * * * *